F. J. MASON.
PEDAL PAD.
APPLICATION FILED FEB. 24, 1913.
1,182,579.
Patented May 9, 1916.
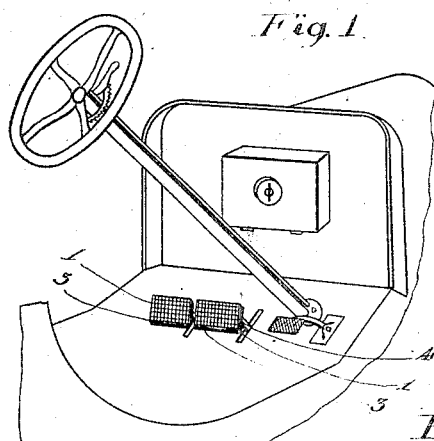
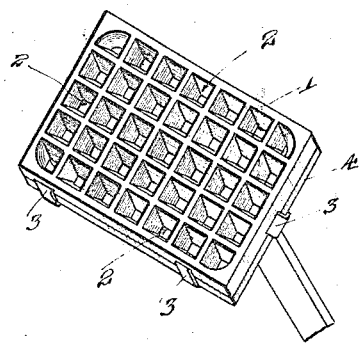
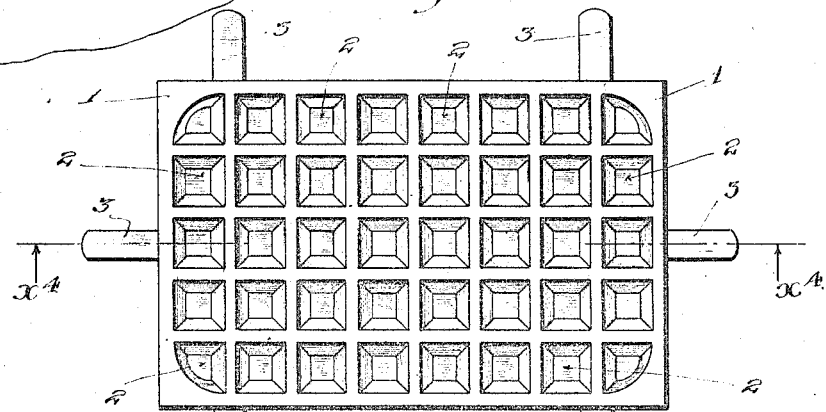
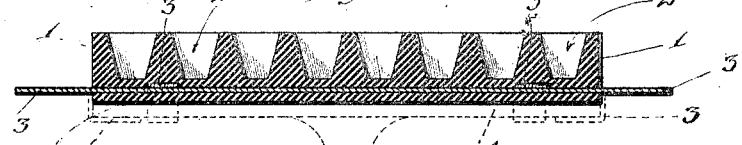
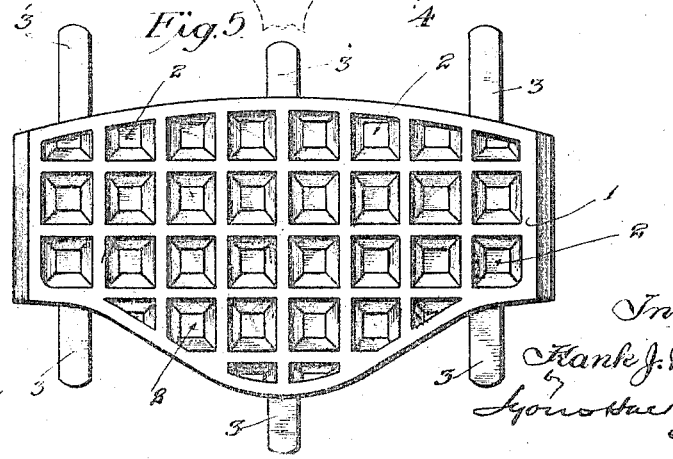

UNITED STATES PATENT OFFICE.

FRANK J. MASON, OF LOS ANGELES, CALIFORNIA, ASSIGNOR OF ONE-HALF TO SCOTT E. ALLEN, OF LOS ANGELES, CALIFORNIA, AND ONE-HALF TO J. C. RICE, OF SAN DIEGO, CALIFORNIA.

PEDAL-PAD.

1,182,579.

Specification of Letters Patent.

Patented May 9, 1916.

Application filed February 24, 1913. Serial No. 750,436.

*To all whom it may concern:*

Be it known that I, FRANK J. MASON, a citizen of the United States, residing at Los Angeles, county of Los Angeles, State of California, have invented a new and useful Pedal-Pad, of which the following is a specification.

This invention relates to a pedal pad adapted to be attached to the pedal of an automobile or other pedal, to act as a cushion for the foot, and give the foot a secure grip on the pedal preventing it from slipping off.

The object of the invention is to provide a pedal of this character, which can be readily attached to the pedal, and which will prevent the foot from slipping. The form of the pedal pad may be of any shape to correspond with the shape of the pedal, and in the drawings I have only shown two shapes, but it will be understood that the shape of the pedal may be of any desired form.

Referring to the drawings: Figure 1 is a perspective view of the front portion of an automobile, the pedals of which are equipped with the invention. Fig. 2 is a perspective view in detail of the upper portion of a pedal equipped with the device. Fig. 3 is a plan view of the pedal pad in detail before being attached. Fig. 4 is a section on line $x^4$—$x^4$, Fig. 3. Fig. 5 is a view similar to Fig. 3 showing another form.

1 designates the pad which is preferably of rubber and formed with cups or pockets 2 in its upper surface. As herein shown these cups are rectangular with beveled side walls to give the intervening walls proper strength, and the cups act to give a secure grip for the foot. The cups are so arranged as to provide straight walls between them which extend longitudinally and transversely of the pad. Metal bands 3 extend laterally and transversely through the base portion of the pad, being molded therein, and the ends of the bands project from the pad and form means for attaching the pad to the pedal 4 by bending them around the edge of the pedal, as clearly shown in Fig. 2, and indicated by dotted lines in Fig. 4. By reason of the fact that the metal bands are molded in the pad and extend continuously, from edge to edge thereof, the pad may be readily bent either into convex or concave form in accordance with the varying contours of the pedals commonly used in automobiles, and the like. The capacity for thus bending the pad while at the same time preserving all of the advantages which follow from employing continuous strips of metal in the pad, having projecting ends to be bent around the pedals, constitutes an important feature of the invention. These bands firmly hold the pad in place on the pedal and enable the pad to be attached in a moment. At points where there is great strain on the pad, as for example in the center of the pad, as shown in Fig. 3 of the drawing, the strip 3 may be located directly under one of the walls formed by the recesses 2 which arrangement reinforces the pad at such point against such strain.

Fig. 5 shows another modified shape adapted for use with a correspondingly shaped pedal.

What I claim is:

A pedal pad comprising a yieldable pad and relatively narrow bendable metal reinforcing and securing strips embedded permanently in and extending through said pad from edge to edge thereof and having their ends extending beyond the edges of the pad and adapted to be bent over a pedal.

In testimony whereof, I have hereunto set my hand at Los Angeles, California this 18th day of February 1913.

FRANK J. MASON.

In presence of—
G. T. HACKLEY,
MARTHA M. LANGE.